(12) United States Patent
Hayashi et al.

(10) Patent No.: US 8,037,489 B2
(45) Date of Patent: Oct. 11, 2011

(54) DISK DEVICE

(75) Inventors: Ryuuji Hayashi, Osaka (JP); Katsuo Ichinohe, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 515 days.

(21) Appl. No.: 12/212,719

(22) Filed: Sep. 18, 2008

(65) Prior Publication Data

US 2009/0083776 A1    Mar. 26, 2009

(30) Foreign Application Priority Data

Sep. 21, 2007   (JP) .................................. 2007-244891

(51) Int. Cl.
*G11B 17/04*   (2006.01)

(52) U.S. Cl. ....................................................... 720/692

(58) Field of Classification Search .................... 720/692
See application file for complete search history.

(56) References Cited

U.S. PATENT DOCUMENTS

| | | | |
|---|---|---|---|
| 5,317,464 A | 5/1994 | Witt et al. | 360/99.08 |
| 6,859,935 B2 | 2/2005 | Kume | |
| 7,065,772 B2 * | 6/2006 | Kagawa | 720/608 |
| 7,162,726 B2 * | 1/2007 | Umesaki et al. | 720/674 |
| 2003/0142611 A1 | 7/2003 | Kume | 369/75.2 |
| 2006/0072384 A1 * | 4/2006 | Fukasawa | 369/44.14 |
| 2006/0095928 A1 * | 5/2006 | Makino | 720/601 |
| 2007/0162919 A1 | 7/2007 | Omori et al. | 720/700 |
| 2008/0028418 A1 * | 1/2008 | Fukasawa | 720/608 |
| 2009/0125927 A1 * | 5/2009 | Fukasawa et al. | 720/661 |

FOREIGN PATENT DOCUMENTS

| | | |
|---|---|---|
| JP | 2003-223776 A | 8/2003 |
| JP | 2007-172787 | 7/2007 |
| WO | WO 03/085662 | 10/2003 |

* cited by examiner

*Primary Examiner* — Mark Blouin
(74) *Attorney, Agent, or Firm* — Morgan, Lewis & Bockius LLP

(57) ABSTRACT

A disk device includes: a traverse chassis, one end of which is configured to be movable between a first position and a second position in a first direction; a cam member, formed with a cam groove configured to move in a second direction orthogonal to the first direction and having a first end and a second end; a cam follower fitted with the cam groove so as to be movable between the first end and the second end in accordance with the movement of the cam member; a guide member, having a guide face configured to guide the cam follower in the first direction in cooperation with the cam member; and an urging member, configured to urge the cam follower against an inner wall of the cam groove and the guide face when the cam follower is placed in the first end.

7 Claims, 5 Drawing Sheets

DISK DEVICE

BACKGROUND

1. Field of the Invention

The present invention relates to a disk device, in particular, a disk device in which a turntable, coacting with a clamper to clamp a disk and rotating the disk, is mounted on a traverse chassis and in which a countermeasure for suppressing reading error of the disk due to self-induced vibration of the traverse chassis is applied.

2. Description of the Related Art

With this type of disk device, one end of the traverse chassis is supported on a fixed frame (loader chassis), and the traverse chassis is enabled to tiltingly move (enabled to move reciprocatingly) along a rectilinear path with a position of support by the fixed frame as a pivot. The turntable is mounted, along with an optical element, such as an optical pickup, etc., on the traverse chassis, and when the traverse chassis moves onward along with the turntable, the disk, mounted on the turntable, is clamped by coaction of the turntable and a clamper, attached to the fixed frame and waiting at a fixed position. The disk, clamped by the clamper and the turntable, rotates together with the turntable, and during the rotation, the disk is optically processed by the optical pickup.

With this type of disk device, there is known a configuration employing a cam mechanism, to be described below, as a means for making the traverse chassis undergo reciprocal movement (see JP-A-2003-223776). This is a schematic exploded perspective view of a cam mechanism 10 described in JP-A-2003-223776.

FIG. 5 is a schematic front view of the cam mechanism 10 of a disk device described in JP-A-2003-223776. The cam mechanism 10 is constituted of a follower 20, disposed on the traverse chassis (not shown), a cam plate 30, moved forward and in reverse as indicated by arrows X in a direction orthogonal to a direction of reciprocal movement of another end of the traverse chassis, a cam groove 31, formed in the cam plate 30 and making the follower 20 slide to make the other end of the traverse chassis move reciprocatingly along a rectilinear path, and an auxiliary guiding member 40, having straight guiding surfaces 41 that make the follower 20 slide when the cam plate 30 is moved forward and in reverse to guide the reciprocal movement of the follower 20. The cam groove 31 of the cam plate 30 includes a horizontal first riding surface 32, onto which the follower 20 rides at its onward movement limit position, a horizontal second riding surface 33, onto which the follower 20 rides at its return movement limit position, and an inclined surface 34, making the first and second riding surfaces 32 and 33 continuous.

In the disk device, including the cam mechanism 10, when the turntable, mounted on the traverse chassis, and the clamper coact to clamp a disk, the follower 20 of the cam mechanism 10 that rides on the first riding surface 32 of the cam groove 31 is clamped by the guiding surfaces 41 as shown in FIG. 5. The follower 20 and the other end of the traverse chassis provided with the follower 20 are thus provisionally positioned in the reciprocal movement direction (vertical direction), indicated by arrows A in the figure, and a direction (left/right direction), indicated by arrows B in the figure and orthogonal to the reciprocal movement direction of the traverse chassis.

With the cam mechanism 10 described with reference to FIG. 5, for a vibration absorbing action by an elastic member 23 of the follower 20 to be exhibited with good efficiency, the follower 20 of the cam mechanism 10, riding on the first riding surface 32 of the cam groove 31, is desirably clamped by the guiding surfaces 41 and positioned accurately in the mutually orthogonal directions indicated by the arrows A and B.

However, because gaps that are essential for allowing smooth movement of the follower 20 and gaps, etc., due to manufacturing errors are present between the guiding surfaces 41 and the follower 20 of the cam mechanism 10 riding on the first riding surface 32 of the cam groove 31 and between the follower 20 and the cam groove 31, the follower 20 is not accurately positioned without play in the mutually orthogonal directions indicated by the arrows A and B. Thus with the cam mechanism 10, when the traverse chassis undergoes self-induced vibration during disk rotation, the entirety of the follower 20 may vibrate and the vibration absorbing action by the elastic member 23 of the follower 20 may not be exhibited efficiently. When the follower 20 thus undergoes self-induced vibration and the vibration absorbing property of the elastic member 23 degrades, the rotating disk vibrates, causing optical reading errors by the optical pickup to occur readily and thus image distortion, sound skipping, etc., to occur readily.

This problem is known to occur especially readily during reproduction of a disk with a mass eccentricity, etc. There is also a possibility for optical reading errors occurring readily due to deformation of the first riding surface 32 of the cam groove 34, the guiding surfaces 41 of the auxiliary guiding member 40, etc., caused by influence of heat generated by the vibration of the follower accompanying the self-induced vibration of the traverse chassis, and it is known that the possibility of this occurring is especially high under a high temperature environment, such as 65° C. temperature and 80% humidity, or after high temperature storage, such as 120 hours of storage under 65° C. temperature and 80% humidity.

SUMMARY

It is therefore one advantageous aspect of the invention to provide a disk device, with which optical reading errors by an optical pickup can be made less likely to occur by suppressing a follower of a cam mechanism, riding on a riding surface of a cam groove, from vibrating in accompaniment to self-induced vibration of a traverse chassis during rotation of a disk.

According to the above aspect, the follower is provided by a vibration absorbing action based on an action of an elastic member. Therefore, the disk device with which optical reading errors by the optical pickup can be made less likely to occur by preventing lowering of a vibration absorbing property of the elastic member of the follower, riding on the riding surface of the cam groove.

Further, according to the above aspect, since a configuration of the disk device can be achieved by simply improving a configuration of a portion of the cam mechanism of the disk device described with reference to FIG. 5 and without adding extra parts.

According to a first aspect of the invention, there is provided a disk device including: a traverse chassis, one end of which is configured to be movable between a first position and a second position in a first direction, the traverse chassis adapted to mount a turntable for a disk medium thereon; a cam member, formed with a cam groove configured to move in a second direction orthogonal to the first direction and having a first end and a second end; a cam follower, protruded from the one end of the traverse chassis, and fitted with the cam groove so as to be movable between the first end and the second end in accordance with the movement of the cam member; a guide member, having a guide face configured to guide the cam follower in the first direction in cooperation with the cam member, thereby causing the one end of the traverse chassis to move between the first position and the second position; and an urging member, configured to urge the cam follower against an inner wall of the cam groove and the guide face when the cam follower is placed in the first end of the cam groove.

With this configuration, when, by the follower sliding along the cam groove and reaching the onward movement limit position, the disk is clamped by the turntable and the clamper, the follower of the cam mechanism, riding on the riding surface of the cam groove, is elastically pressed by both the riding surface of the cam groove and the guiding surface of the auxiliary guiding member. The follower is thus accurately positioned without play in two mutually orthogonal directions and helps to suppress self-induced vibration of the traverse chassis. A disk device can thus be provided, which resolves the problem of a rotating disk vibrating and causing optical reading errors by the optical pickup to occur readily and thus with which image distortion, sound skipping, etc., do not occur readily.

The follower may include: a protrusion, formed on the traverse chassis; an elastic member, provided on the protrusion; and a cover, provided on the elastic member and fitted with the cam groove. With the follower having this configuration, when by the follower sliding along the cam groove and reaching the onward movement limit position, the disk is clamped by the turntable and the clamper, the cylindrical cover of the follower, riding on the riding surface of the cam groove, is elastically pressed by both the riding surface of the cam groove and the guiding surface of the auxiliary guiding member. The cover of the follower is thus accurately positioned without play in two mutually orthogonal directions and lowering of a vibration absorbing property of the elastic member that exhibits the damper action is prevented. The self-induced vibration of the traverse chassis is thus absorbed efficiently by the elastic member and this helps in making optical reading errors by the optical pickup less likely to occur. Also, deformation of the riding surface of the cam groove, the guiding surface of the auxiliary guiding member, etc., caused by influence of heat generated by the vibration of the follower accompanying the self-induced vibration of the traverse chassis, is suppressed and optical reading errors are made less likely to occur.

The urging member may be configured to urge the cam follower in an oblique direction with respect to both the inner wall and the guide face. The urging member may be monolithically formed with the guide member. The urging member may be comprised of resin. By thus integrally molding the urging member together with the auxiliary guiding member from resin, a merit of making it unnecessary to add the urging member as an extra part is provided.

The guide member may be monolithically formed with a fixed frame supporting the traverse chassis, and guide member may be comprised of resin.

As described above, with the disk device according to the present invention, even when the traverse chassis undergoes self-induced vibration during rotation of the disk clamped by the turntable and the clamper, vibration of the follower of the cam mechanism, riding on the riding surface of the cam groove, is suppressed and optical reading errors by the optical pickup are thus made less likely to occur. In particular, in a disk device that includes a cam mechanism, with which a follower is provided with a vibration absorbing action based on an action of an elastic member, the vibration absorbing action by the elastic member is improved and optical reading errors by the optical pickup are made less likely to occur.

Furthermore, the present invention provides an effect of enabling the vibration of the follower due to self-induced vibration of the traverse chassis to be suppressed and enabling the action of making optical reading errors by the optical pickup less likely to occur to be obtained by simply improving the configuration of a portion of the cam mechanism and without adding extra parts.

BRIEF DESCRIPTION OF THE DRAWINGS

Embodiment may be described in detail with reference to the accompanying drawings, in which.

DETAILED DESCRIPTION OF THE INVENTION

Figure 1:
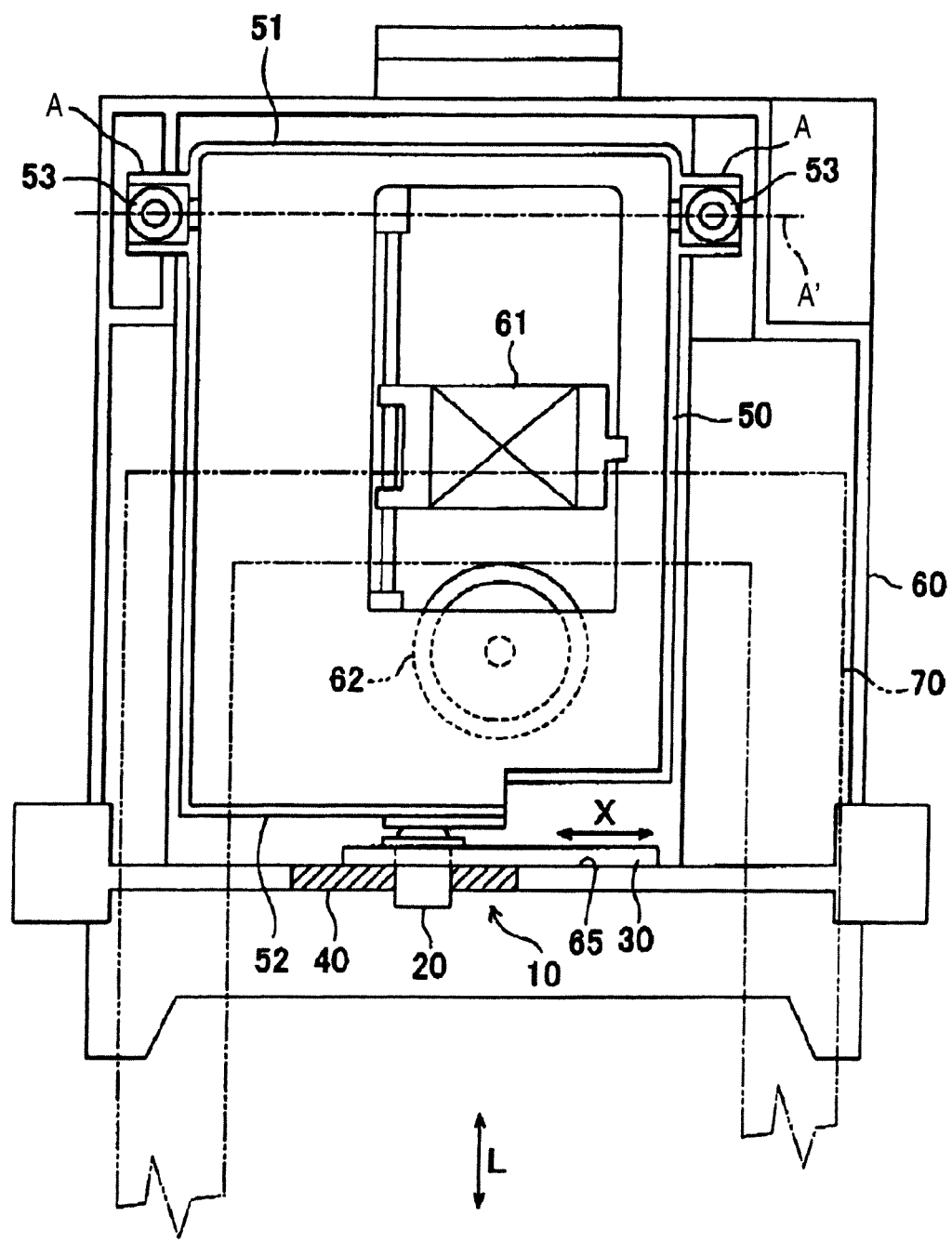
FIG. 1 is a plan view of a general configuration of a disk device according to an embodiment of the present invention as viewed from a rear side.
Figure 2:
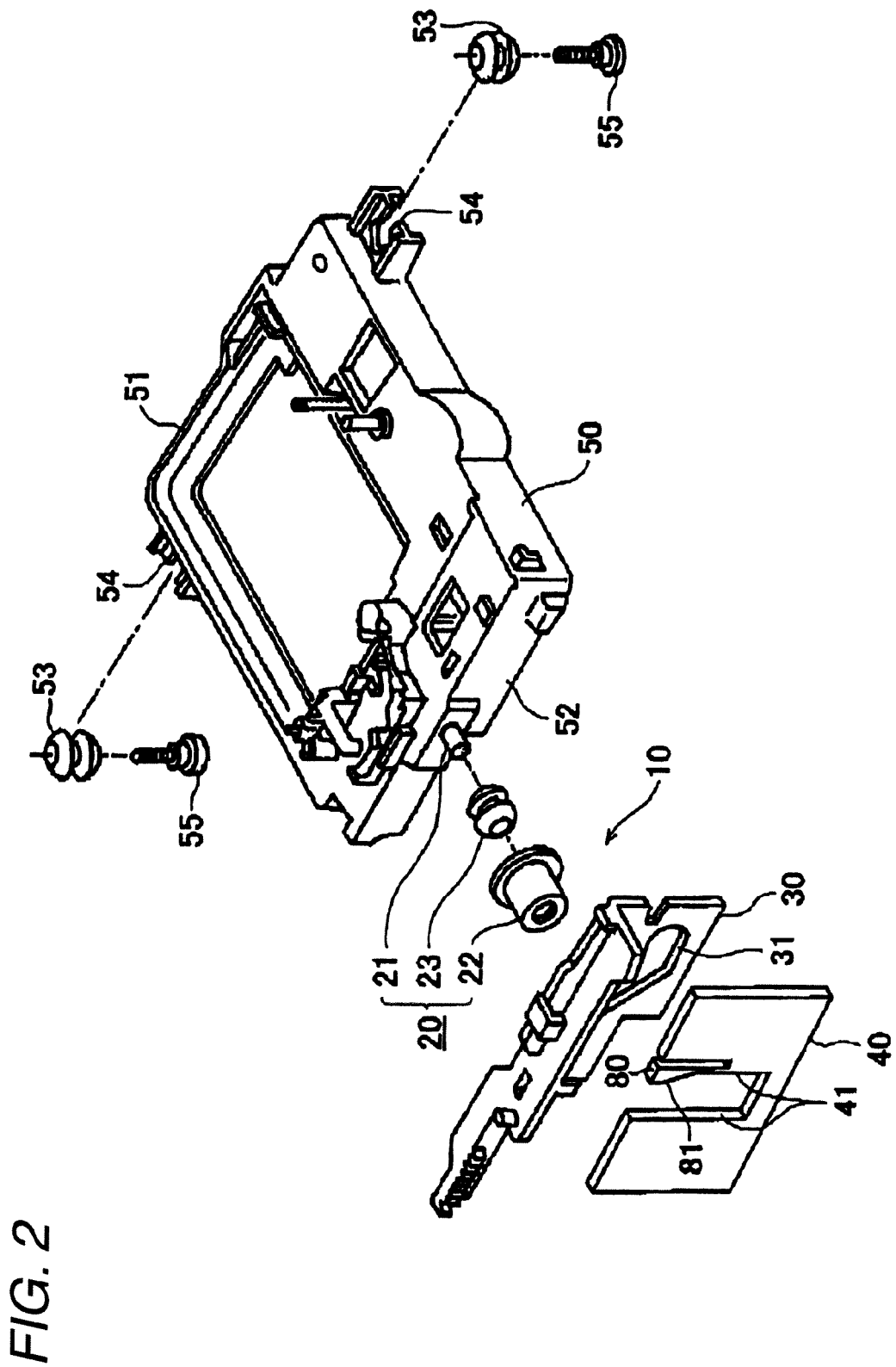
FIG. 2 is a schematic exploded perspective view of a traverse chassis and a cam mechanism used in the disk device of FIG. 1.
Figure 3:
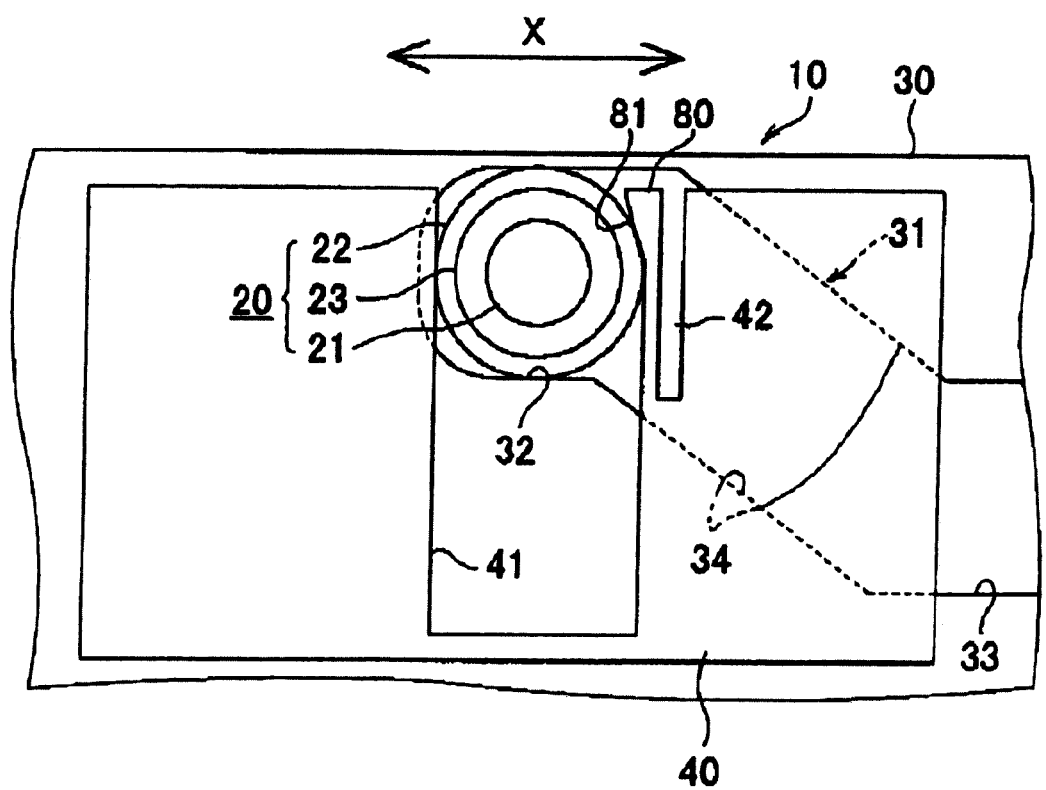
FIG. 3 is a schematic front view of the cam mechanism.
Figure 4:
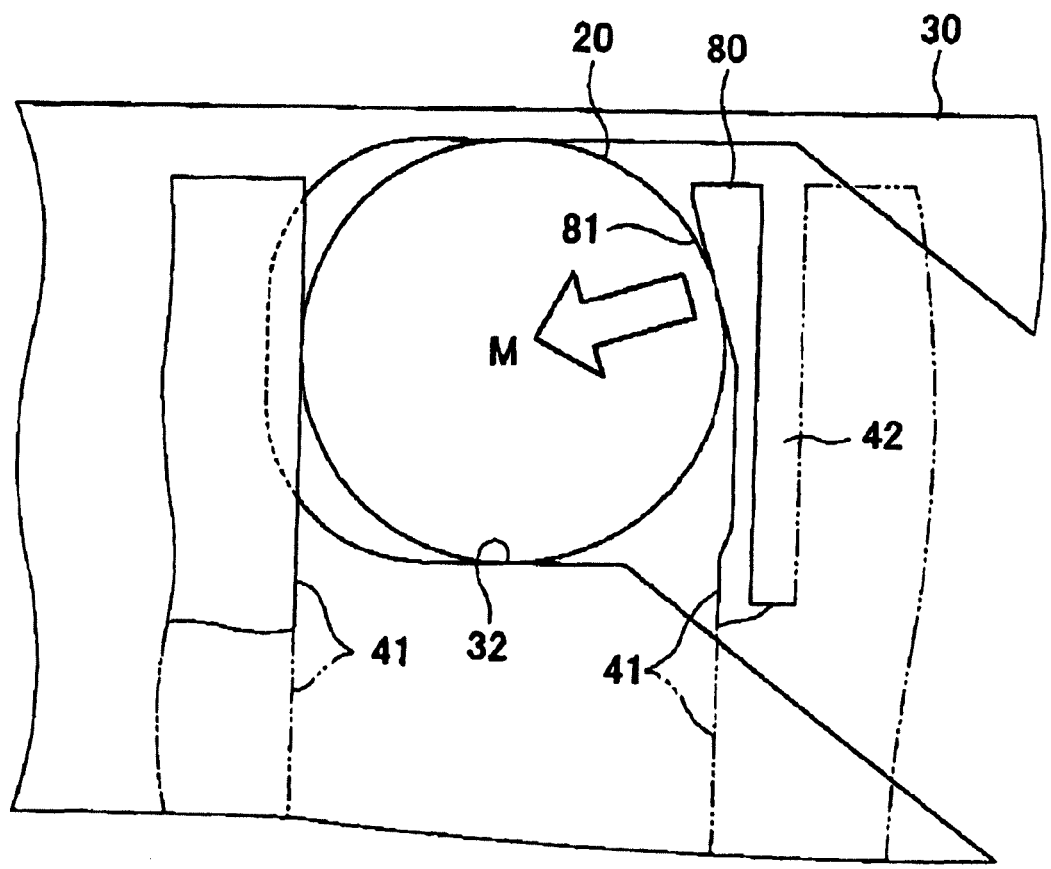
FIG. 4 is an enlarged explanatory diagram of a principal portion of FIG. 3.

FIG. 1 is a plan view of a general configuration of a disk device according to an embodiment of the present invention as viewed from a rear side, and FIG. 2 is a schematic exploded perspective view of a traverse chassis 50 and a cam mechanism 10 used in the disk device of FIG. 1. FIG. 3 is a schematic front view of the cam mechanism 10, and FIG. 4 is an enlarged explanatory diagram of a principal portion of FIG. 3.

In FIG. 1, 60 is a fixed frame, serving as a loader chassis and formed to a rectangular frame form, and with respect to the fixed frame 60, a disk tray 70, indicated by hypothetical lines, is enabled to move in an ejection/insertion direction (front/rear direction) indicated by arrows L. Although not illustrated, a mounting portion for a circular disk is formed in a recessed manner on an upper surface of the disk tray 70, and a disk mounted on the mounting portion is inserted and ejected with respect to a set position substantially at a center of the fixed frame 60 by movement of the disk tray 70 in the direction of the arrows L.

In addition to an optical pickup 61 or other optical element, a traverse chassis 50, carrying a turntable 62, is attached to the fixed frame 60. One end 51 in a longitudinal direction (matching the front/rear direction) of the traverse chassis 50 is attached to the fixed frame 60, and another end (free end) 52 at an opposite side in the longitudinal direction is made tiltable in a vertical direction about attachment locations A as pivots. In the illustrated disk device, cushioning members 53 are interposed at the attachment locations A to prevent impact from the fixed frame 60, etc., from being transmitted to the traverse chassis 50. Each cushioning member 53 is constituted of vibration-proof rubber and is held by the traverse chassis 50 by being fitted in a split hole 54, formed in the one end 51 of the traverse chassis 50 as shown in FIG. 2, and attaching screws 55, inserted into the cushioning members 53 from below, are screwed into threaded holes (not shown) of the fixed frame 60 shown in FIG. 1. When the one end 51 of the traverse chassis 50 is thus attached to the fixed frame 60, the other end 52 of the traverse chassis 50 is enabled, via deformation of the cushioning members 53, to move reciprocatingly (move tiltingly) along a rectilinear path about an alternate long and short dash line A' with the attachment locations A as the pivot. Moreover, an impact generated at the fixed frame 60 is absorbed by the cushioning members 53 and made unlikely to be transmitted to the traverse chassis 50. The cushioning members 53 and the attaching screws 55 constitute a supporting mechanism that supports the one end 51 of the traverse chassis 50 on the fixed frame 60.

The cam mechanism 10, shown in FIG. 2, includes a follower 20, disposed on the other end of the traverse chassis 50, a cam plate 30, a cam groove 31, formed in the cam plate 30, and an auxiliary guiding member 40. In the present embodiment, the follower 20 includes a protrusion 21, disposed at a central portion of the other end of the traverse chassis 50, a cylindrical cover 22, externally fitted onto the protrusion 21 and sliding along both the cam groove 31 and guiding surfaces 41 of the auxiliary guiding member 40 during reciprocal movement, and a tubular elastic member 23, interposed between the protrusion 21 and the cover 22 and exhibiting a damper action. The cam plate 30 is enabled to move forward and in reverse in a direction (left/right direction indicated by arrows X) orthogonal to the reciprocal movement direction of the other end 52 of the traverse chassis 50. The guiding surfaces 41 of the auxiliary guiding member 40 make the follower 20 slide when the cam plate 30 moves forward and in reverse and guides straight, reciprocal movement of the follower 20.

Figure 5:
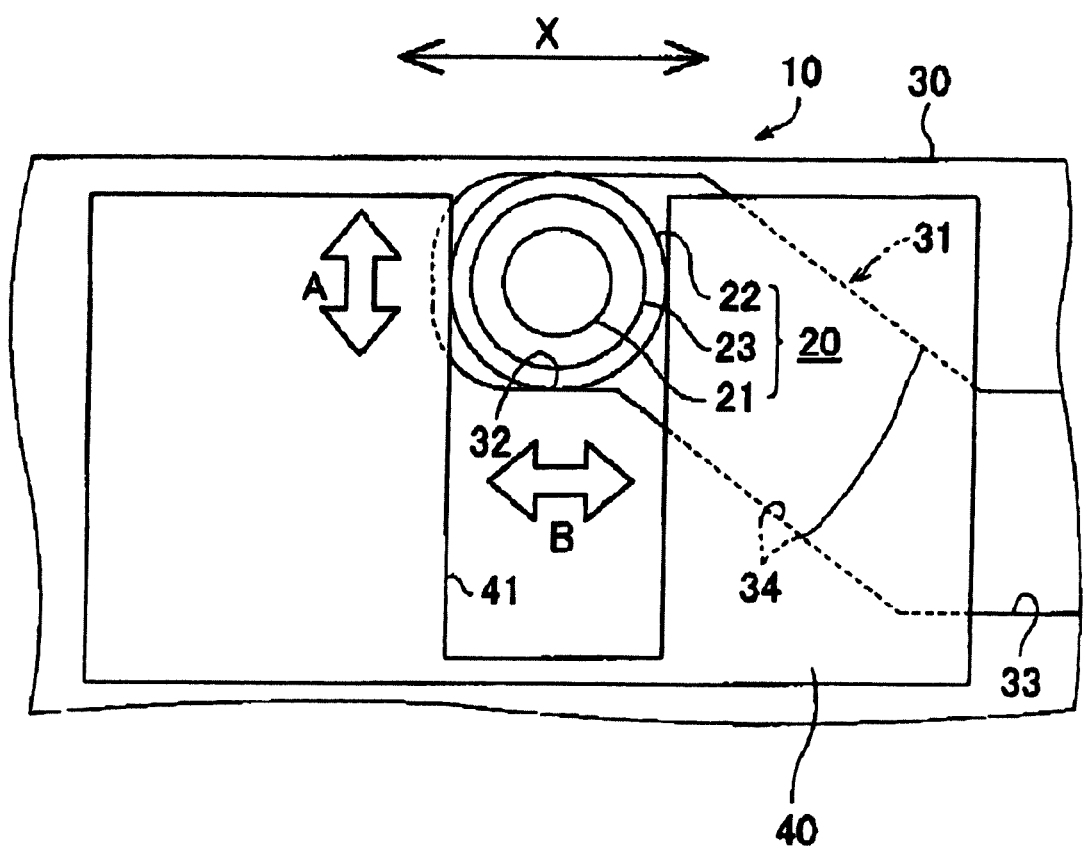
FIG. 5 is a schematic front view of a cam mechanism used in a disk device of a conventional example.

The above configuration with regard to the cam mechanism 10 is the same as that of the cam mechanism 10 described with reference to FIG. 5. With the present disk device, a clamper (not shown) is attached to the fixed frame 60, and the clamper is enabled to coact with the turntable 62, mounted on the traverse chassis 50, to clamp the disk, and the disk, clamped by the clamper and the turntable 62, is made to rotate along with the turntable 62.

When the turntable 62, mounted on the traverse chassis 50, and the clamper coact to clamp the disk, the follower 20 of the cam mechanism 10, riding on a first riding surface 32 of the cam groove 31, is clamped by the guiding surfaces 41 as shown in FIG. 3. The follower 20 and the other end 52 of the traverse chassis 50 provided with the follower 20 are thus provisionally positioned in the reciprocal movement direction (vertical direction) of the traverse chassis 50 and the direction (left/right direction) orthogonal to the reciprocal movement direction of the traverse chassis 50.

However as described above, with the configuration as it is, because gaps that are essential for allowing smooth movement of the follower 20 and gaps, etc., due to manufacturing errors are present between the guiding surfaces 41 and the follower 20 riding on the first riding surface 32 of the cam groove 31 and between the follower 20 and the cam groove 31, the follower 20 cannot be said to be accurately positioned without play in the two mutually orthogonal directions. Thus with the cam mechanism 10 having just the above configuration, when the traverse chassis 50 undergoes self-induced vibration during disk rotation, the entirety of the follower 20 may vibrate and the vibration absorbing action by the elastic member 23 of the follower 20 may not be exhibited efficiently.

Thus with the present embodiment, a urging member is provided that presses the follower 20, riding onto the first riding surface 32 of the cam groove 31, and thereby makes the first riding surface 32 and the guiding surfaces 41 of the auxiliary guiding member 40 elastically press the follower 20. The urging member is a urging member 80, shown in FIGS. 2 to 4. In the figures, the urging member 80 is a resin spring, molded integrally of resin and molded integral to the auxiliary guiding member 40, formed of resin, by making the auxiliary guiding member 40 have a slit 42 extending along a guiding surface 41 of the auxiliary guiding member 40. More specifically as shown in FIG. 3 or 4, the urging member 80, constituted of the resin spring, is formed at a position of elastically contacting the follower 20, riding on the first riding surface 32 of the cam groove 31, and the urging member 80 is provided with an inclined surface 81. By the inclined surface 81 pressing a single location of an outer circumferential surface of the cover 22 of the follower 20, riding on the first riding surface 32 of the cam groove 31, the cover 22 is pressed in a direction inclined with respect to both the first riding surface 32 and the guiding surface 41 as indicated by an arrow M. Thus by an elastically pressing action of the urging member 80, the follower 20, riding on the first riding surface 32 of the cam groove 31, is elastically pressed by both the first riding surface 32 and the guiding surface 41 and the cover 22 is thereby positioned accurately without play in the two mutually orthogonal directions. Consequently, a possibility for an entirety of the follower 20 vibrating and the vibration absorbing action of the elastic member 23 of the follower 20 not being exhibited efficiently when the traverse chassis 50 undergoes self-induced vibration during disk rotation is lessened, and the vibration absorbing property of the elastic member 23 of the follower 20 when the traverse chassis 50 undergoes self-induced vibration is thus improved. By such improvement of the vibration absorbing property of the elastic member 23, the problem of optical reading errors by the optical pickup occurring readily due to vibration of the disk during rotation is resolved, and image distortion, sound skipping, etc., are made less likely to occur, especially even when a disk with a mass eccentricity is handled. A possibility of optical reading errors occurring due to deformation of the first riding surface 32 of the cam groove 34, the guiding surface 41 of the auxiliary guiding member 40, etc., caused by influence of heat generated by the vibration of the follower 20 accompanying the self-induced vibration of the traverse chassis 50, is also eliminated.

Although with the present embodiment, the follower 20 includes the elastic member 23 that exhibits the vibration absorbing property, the elastic member 23 is not necessarily required. That is, a configuration is also possible where the follower is formed of a protrusion, protruded from the other end of the traverse chassis, the protrusion is slidably engaged with the cam groove of the cam plate, and the protrusion is guided along a rectilinear path by the guiding surfaces of the auxiliary guiding member.

What is claimed is:

1. A disk device comprising:

a traverse chassis, one end of which is configured to be movable between a first position and a second position in a first direction, the traverse chassis adapted to mount a turntable for a disk medium thereon;

a cam member, formed with a cam groove configured to move in a second direction orthogonal to the first direction and having a first end and a second end;

a cam follower, protruded from the one end of the traverse chassis, and fitted with the cam groove so as to be movable between the first end and the second end in accordance with the movement of the cam member;

a guide member, having a guide face configured to guide the cam follower in the first direction in cooperation with the cam member, thereby causing the one end of the traverse chassis to move between the first position and the second position; and an urging member, formed in the guide member, and configured to urge the cam follower against an inner wall of the cam groove and the guide face when the cam follower is placed in the first end of the cam groove.

2. The disk device according to claim 1, wherein the follower includes:
   a protrusion, formed on the traverse chassis;
   an elastic member, provided on the protrusion; and
   a cover, provided on the elastic member and fitted with the cam groove.

3. The disk device according to claim 1, wherein
   the urging member is configured to urge the cam follower in an oblique direction with respect to both the inner wall and the guide face.

4. The disk device according to claim 1, wherein
   the urging member is monolithically formed with the guide member.

5. The disk device according to claim 4, wherein
   the urging member is comprised of resin.

6. The disk device according to claim 1, wherein
   the guide member is monolithically formed with a fixed frame supporting the traverse chassis.

7. The disk device according to claim 6, wherein
   the guide member is comprised of resin.

* * * * *